United States Patent
Beatenbough et al.

[15] 3,702,066
[45] Nov. 7, 1972

[54] AUTOMATIC EXPANSION VALVE, IN LINE, PILOTED

[72] Inventors: Paul K. Beatenbough, Medina; Carl A. Scherer, Clarence Center, both of N.Y.

[73] Assignee: General Motors Corporation, Detroit, Mich.

[22] Filed: July 22, 1971

[21] Appl. No.: 165,194

[52] U.S. Cl. .................................................. 62/222
[51] Int. Cl. ............................................. F25b 41/04
[58] Field of Search ................. 62/222, 223, 224, 225

[56] References Cited

UNITED STATES PATENTS

| | | | |
|---|---|---|---|
| 3,242,687 | 3/1966 | Baker | 62/223 |
| 3,252,294 | 5/1966 | Heidorn | 62/224 |
| 3,564,865 | 2/1971 | Spencer | 62/225 |

Primary Examiner—Meyer Perlin
Attorney—W. S. Pettigrew et al.

[57] ABSTRACT

Refrigerating apparatus for an automotive air conditioning system including a pressure responsive expansion valve between the condenser and the evaporator. Movement of a piston valve which is reciprocal within a valve housing controls the flow of refrigerant into the evaporator. Evaporator inlet pressure acts against one end of the piston and a control pressure established by a pilot valve and passage from the condenser outlet acts against an opposite end of the piston to regulate the pressure in the evaporator. An expandable bellows enclosure within a control pressure enclosure moves to open and close the pilot valve passage which produces a relatively constant control pressure.

3 Claims, 4 Drawing Figures

PATENTED NOV 7 1972 3,702,066
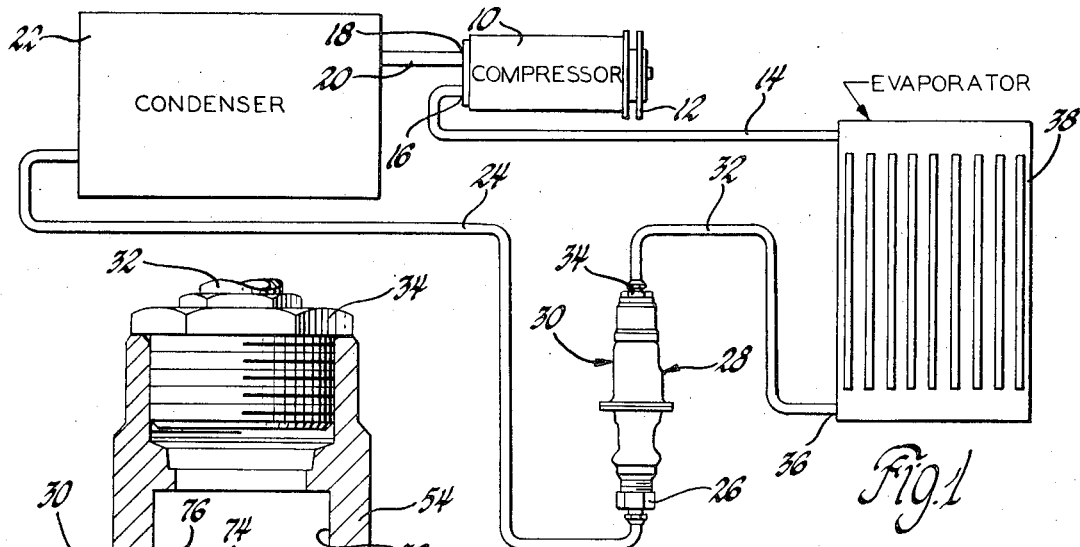
Fig.1
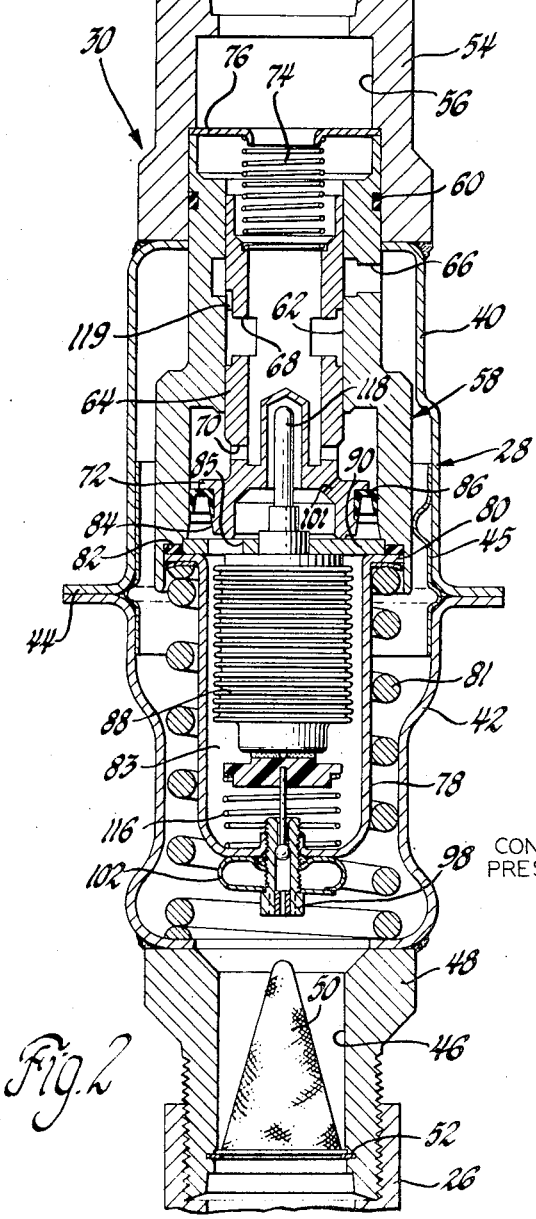
Fig.2
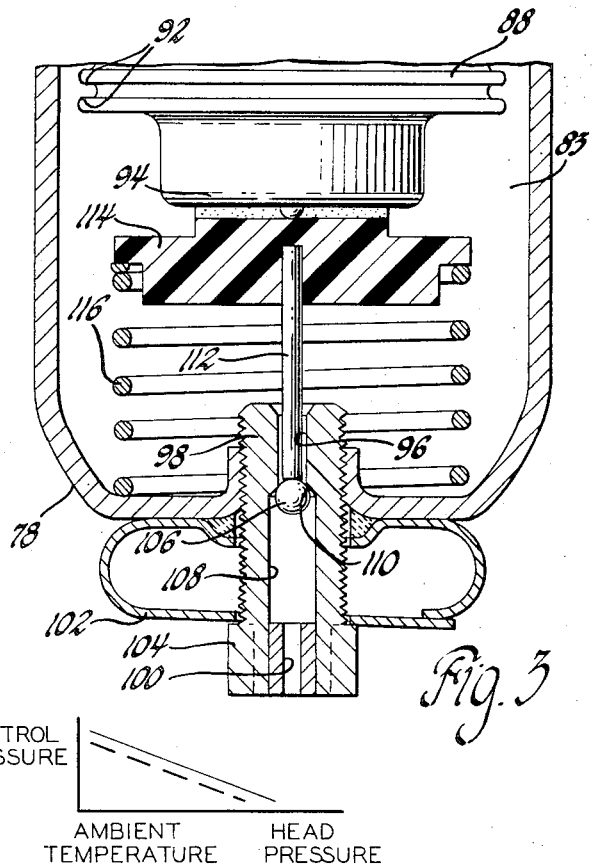
Fig.3
Fig.4
INVENTORS
Paul K. Beatenbough
BY Carl O. Scherer
K.H. MacLean, Jr.
ATTORNEY

3,702,066

AUTOMATIC EXPANSION VALVE, IN LINE, PILOTED

This invention relates to refrigerating apparatus for automotive air conditioning systems and includes a pressure responsive expansion valve between the condenser outlet and the evaporator inlet.

The refrigerant compressor in automotive air conditioning systems is commonly driven by a variable speed internal combustion engine. This creates a tendency for frost to form on the evaporator when the system is operated in a relatively cool ambient temperature since at highway speeds compressor capacity tends to exceed the heat load on the evaporator. This creates large withdrawal rates from the evaporator which lowers evaporator pressure to a level corresponding to freezing temperatures. To prevent forming low pressures in the evaporator, an evaporator outlet throttling valve in the suction line between the evaporator and the compressor commonly is used to prevent the evaporator pressure and therefore temperature from falling below the freeze point of the evaporator. Such valves are expensive and their flow restrictive throttling action reduces thermal efficiency of the system.

The present automotive air conditioning system eliminates the pressure regulating throttling valve in the suction conduit by providing an expansion valve preceding the evaporator inlet which will open directly in response to low evaporator pressure to introduce sufficient refrigerant for maintaining evaporator pressures above the freezing level. More particularly, the expansion valve includes a tubular outer housing with an inlet and an outlet respectively at its end. The housing encloses a valve housing defining a piston cylinder and an interconnected control pressure chamber. One end of a piston valve in the cylinder is exposed to evaporator inlet pressure and the other end is exposed to a relatively constant control pressure in the control chamber. Slots in the piston valve and the cylinder housing are aligned when the piston valve is moved into an open position.

The relatively constant pressure within the control chamber is produced by movement of an expansible bellows which controls a pilot valve passage extending from the control chamber to the inlet of the expansion valve. A coil spring maintains the piston valve toward a closed position until evaporator inlet pressure falls below a predetermined level. Then, the action of evaporator inlet pressure and control pressure acting on the piston causes the piston valve to move to a more open position to increase the flow of refrigerant into the evaporator. This increases the pressure in the evaporator and prevents it from falling below the predetermined pressure level at which frost accumulation occurs.

Therefore, it is an object of this invention to provide a refrigerant flow controlling expansion valve supplying refrigerant to the evaporator for maintaining the evaporator pressure above a level which prevents frost accumulation thereon regardless of variation in compressor speed.

It is a further object of this invention to provide a refrigerant flow controlling expansion valve which opens in response to a predetermined decrease in evaporator pressure to supply sufficient refrigerant to the evaporator for preventing its temperature from falling below 32° F.

It is a still further object of this invention to pRovide a refrigerant flow controlling expansion valve which opens to supply refrigerant to the evaporator in response to evaporator inlet pressure and a control pressure which is established by a pilot valve passage opened and closed by an expansible bellows.

Further objects and advantages of the present invention will be apparent from the following description, reference being had to the accompanying drawings, wherein a preferred embodiment of the present invention is clearly shown.

IN THE DRAWINGS

FIG. 1 is a diagrammatic view of an automobile air conditioning system employing the present expansion valve;

FIG. 2 is a vertical sectional view of the expansion valve shown in FIG. 1;

FIG. 3 is an enlarged fragmentary sectional view of the pilot valve assembly shown in FIG. 2; and FIG. 4 is a plot of control pressure versus ambient temperature and head pressure.

Referring to FIG. 1, there is illustrated a refrigerant compressor 10 having a pulley 12 adapted to be driven at a fixed speed ratio to the automobile engine speed by a belt from a pulley on the front of an automobile engine crankshaft (not shown). This compressor 10 withdraws refrigerant through the suction conduit 14 into a compressor inlet 16 and pumps the compressed refrigerant from the compressor outlet 18 through a discharge conduit 20 into the air cooled condenser 22 which is located in front of the automobile radiator.

The compressed refrigerant from the compressor 10 is cooled and liquified in the condenser 22 and flows therefrom through a conduit 24 through a fitting 26 and discharges into an inlet of a tubular housing 28 of an expansion valve assembly 30. A conduit 32 extends from fitting 34 on the outlet end of the housing 28 to the inlet 36 of an evaporator 38.

The expansion valve assembly 30 which is shown in more detail in FIG. 2 includes tubular housing 28 which is formed by upper and lower members 40 and 42 joined together at outwardly extending flange portions 44 and an inner sleeve 45. An inlet passage 46 is formed within an inlet fitting 48 to which the fitting 26 is threadably secured. Inlet fitting 48 is secured to the end of the member 42 by welding or other suitable fastening means. A conical strainer assembly 50 within the inlet passage 46 is secured by expansion ring 52. An expansion valve outlet 54 with an outlet passage 56 therein is welded to the upper end of member 40 and is threadable engaged to the fitting 34 which joins conduit 32 to the expansion valve.

An inner valve housing 58 is supported within tubular housing 28 between inlet passage 46 and outlet passage 56. The upper end of the housing 58 is supported in sealing relation to the fitting 54 and an O-ring type seal 60 prevents refrigerant leakage therebetween. A piston cylinder chamber 62 is formed in the upper end of housing 58. A piston valve 64 is mounted within the piston cylinder 62 and is free to reciprocate axially therein. Slots 66 and 68 are formed in the wall of the housing 58 and the wall of the piston valve 64, respectively. Slots 66 and 68 are adapted to align when the piston valve 64 is moved to an open position to form a refrigerant flow path from inlet passage 46, through slots 66 and 68 to the outlet passage 56. Refrigerant pressure in the outlet passage 56 which corresponds to evaporator inlet pressure is communicated through a small port 70 in the piston valve 64 to one end face 72 of the valve 64. A compression type coil spring 74 extends between a retainer 76 and the upper end of valve 64 to bias the piston valve 64 toward its closed position shown in FIG. 2.

A cup-shaped member 78 is supported at its edge 80 to the lower end of housing member 58 by a compression type coil spring 81. An O-ring type seal member 82 prevents refrigerant leakage therebetween. The member 78 forms a control chamber enclosure 83 which is fluidly communicated with an end 84 of the piston valve 64 through a port 85. An annular seal member 86 around the valve 64 prevents refrigerant leakage between the piston valve and the wall of piston chamber 62.

Control chamber 83 encloses a sealed cylindrical casing or bellows 88 which is supported at one end by a member 90 between the housing 58 and member 78. The cylindrical side surface of the casing 88 is formed by integrally connected corrugated metal walls 92 which move with respect to each other in response to pressure changes in the control chamber 83. Movement of the casing or bellows 88 causes free end 94 to move with respect to member 78.

The end of member 78 supports a pilot valve passage 96 within a fitting 98 which is threadably secured to the member 78. The pilot valve passage 96 communicates the control chamber 83 with refrigerant in the inlet passage 46 through an extension passage 100 in fitting 98. A small bleed hole 101 through end 72 of valve 64 maintains a small flow through control cavity 83. A spring type clip 102 between the end of member 78 and an enlarged portion 104 of fitting 98 prevents movement once calibration has been made.

A spherical pilot valve member 106 within an enlarged chamber 108 of fitting 98 is adapted to seat against the valve seat 110 to control refrigerant flow. The valve member 106 normally presses against valve seat 110 because of the greater refrigerant pressure in inlet passage 46 than in control chamber 83. A valve rod 112 extends through the pilot valve passage 96 from a base member 114 attached to the free end 94 of bellows 88. A coil spring 116 between base member 114 and the member 78 normally spaces the valve rod 112 from the valve member 106.

A substantially constant control pressure is maintained within chamber 83 by a balancing of refrigerant pressures around the bellows 88 and in the bellows 88. A tube 118 is used to evacuate and fill the bellows. This causes movement of the free end 94 of bellows 88 with pressure changes in enclosure 83. A decrease in pressure within control chamber 83 causes the bellows to expand and its free end 94 to move toward fitting 98. This movement unseats the pilot valve member 106 from seat 110 and admits relatively high pressure refrigerant into control chamber 83. As the pressure within control chamber 83 increases to a desirable control level, the bellows 88 contracts and moves free end 94 to seat the pilot valve member 106. In this way, a substantially constant control pressure is maintained within control chamber 83. The opposing forces of the control pressure against the end 84 of piston 64 and evaporator pressure against the end 72 determine the pistons location. Thus, a decrease of evaporator pressure causes movement of the piston valve 64 against the force of spring 74 and the lesser pressure force in the evaporator inlet to align slots 66 and 68 to introduce refrigerant into the evaporator and increase its pressure.

When compressor capacity tends to exceed the heat load on the evaporator 38 which corresponds to most high ambient temperature highway conditions, the evaporator pressure is relatively low due to the rapid withdrawal of the refrigerant by the compressor. This tends to maintain the piston valve 64 in an open position, thus flooding the evaporator with refrigerant. This is advantageous because in parallel tube evaporators with many parallel finned tubes, there is a tendency during high ambient operation to develop hot spots (superheated refrigerant) on one side of the evaporator. The opening of the expansion valve under these conditions helps to wash out hot spots from the evaporator and improve cool air discharge temperature performance.

When the automobile is idling with a high heat load on the evaporator, the evaporator pressure tends to increase because of the decreased withdrawal rate of refrigerant from the evaporator. This increase in internal pressure may close the expansion valve 30. Thus, it may be desirable to provide a fixed leakage by a slot 119 in the piston valve 64 to optimize idle speed performance by at least a minimum refrigerant flow through the evaporator for compressor lubrication and minimum air discharge temperature.

Normally, the present pressure responsive expansion valve controls refrigerant flow into the evaporator for maintaining at least a 28 psig pressure level therein to prevent freezing evaporator temperatures. As the ambient temperature increases, however, it has been observed that evaporator pressures lower than 28 psig can be tolerated without frost formation. This is partially explained by the increased rate of heat input to the evaporator due to an increased temperature difference between the faces of the evaporator under higher ambient temperature conditions. FIG. 4 illustrates this observation which shows the relation of control pressure in chamber 50 to ambient temperature for a given evaporator and refrigerant system. The broken line represents the evaporator freeze line below which frost will accumulate at corresponding control pressures and ambient temperatures. It is known that refrigerant head pressure at the condenser outlet is nearly independent of automobile speed but is proportional to changes in ambient temperature. Thus, increased ambients will produce proportionate increases in head pressures over a given speed range. This relation explains the dual labeling of the horizontal axis of the graph in FIG. 4.

The subject expansion valve utilizes the relation between ambient temperature and head pressure to decrease the effective control pressure and thus the pressure of refrigerant maintained in the evaporator with increases in head pressure at the inlet of the expansion valve. Specifically, the force of head pressure (condenser outlet) upon the pilot valve member 106 effectively lowers the control pressure within chamber 83. The force to open the pilot valve passage 96 by expansion of the bellows 88 resultantly increases with increasing head pressures and a lower control pressure is established. The lower control pressure acting on the end 84 of the piston valve 64 with increasing head pressure produces corresponding reduced evaporator pressures which act on end 72 of valve 64. Thus, at relatively low head pressures which correspond to low ambients, a greater evaporator pressure is maintained to balance the pressure forces on the piston valve. At higher head pressures, corresponding to high ambients, the control pressure is decreased which produces a decreased evaporator pressure for balancing the pressure forces on the piston valve. This relation is illustrated in FIG. 4. Varying the area of valve member 106 exposed to condenser outlet pressure will vary the slope of the solid line representing control pressure to parallel the broken evaporator freeze line.

While the embodiment of the invention as herein described and illustrated in the drawings constitutes a preferred form, it is to be understood that other forms might be adopted.

What is claimed is as follows:

1. Refrigerating apparatus for an automobile air conditioning system including an evaporator with an inlet and an outlet, a compressor with its inlet fluidly connected to said evaporator outlet and its outlet fluidly connected to the inlet of a condenser, an expansion valve assembly including a tubular housing with an inlet fluidly connected to the condenser and an outlet fluidly connected to the inlet of said evaporator to provide a refrigerant flow passage from said condenser to said evaporator, said tubular housing enclosing a valve housing between said inlet and outlet, said valve housing forming a control chamber and a piston cylinder, a sealed casing within said control chamber having opposite end portions joined by a corrugated side surface for relative movement of said end portions in response to pressure changes within said control chamber, one end portion fixedly connected to said valve housing, a pilot valve passage spaced from the other end portion and extending between said control chamber and said expansion valve inlet, a pilot valve assembly including a valve member closing said pilot valve passage and a valve rod operably connected to the other end portion of said casing to cause the valve rod to contact said pilot valve member and open said pilot valve passage in response to a decrease of pressure within said control chamber, a piston valve mounted for reciprocation in said piston cylinder and exposed on one face to evaporator inlet pressure and exposed on an opposite face to control chamber pressure, said piston valve and said valve housing having slots in their respective walls adapted to align to form a flow passage between said valve inlet and outlet when opposing forces upon the faces of said piston valve move said valve to an open position to admit refrigerant to said evaporator, whereby when evaporator inlet pressure decreases below a predetermined level, the piston valve is moved by a control chamber pressure force to a more open position to admit more refrigerant to said evaporator and resultantly increase its pressure.

2. Refrigerating apparatus for an automobile air conditioning system including an evaporator with an inlet and an outlet, a compressor with its inlet fluidly connected to said evaporator outlet and its outlet fluidly connected to the inlet of a condenser, an expansion valve assembly including a tubular housing with an inlet end fluidly connected to the condenser and an outlet end fluidly connected to the inlet of said evaporator to provide a refrigerant flow passage from said condenser to said evaporator, said tubular housing enclosing a valve housing between said inlet and outlet, said valve housing forming a control chamber and a piston cylinder, a sealed casing within said control chamber having opposite end portions joined by a corrugated side surface for relative movement of said end portions in response to pressure changes within said control chamber, one end portion fixedly connected to said valve housing, a pilot valve passage spaced from the other end portion of said bellows and extending between said control chamber and said expansion valve inlet, a pilot valve assembly including a valve member closing said pilot valve passage and exposed to refrigerant pressure from said condenser outlet for producing a closing force thereon, a valve rod operably connected to the other end portion of said casing and extending through said pilot valve passage to cause the valve rod to contact said pilot valve member and open said passage in response to a decrease of pressure within said control chamber, a piston valve mounted for reciprocation in said piston cylinder and exposed on one face to evaporator inlet pressure and exposed on an opposite face to control chamber pressure, said piston valve and said valve housing having slots in their respective walls adapted to align to form a flow passage between said valve inlet and outlet when opposing forces upon the faces of said piston valve move said valve to an open position to admit refrigerant to said evaporator, whereby as condenser outlet pressure increases corresponding to operation of the refrigerating apparatus in higher ambient temperatures, the control pressure within said control chamber will be reduced by the increased closing force on said pilot valve member which will cause a decrease in evaporator inlet pressure for a given position of said reciprocal piston valve.

3. Refrigerating apparatus for an automobile air conditioning system including an evaporator with an inlet and an outlet, a compressor with its inlet fluidly connected to said evaporator outlet and its outlet fluidly connected to the inlet of a condenser, an expansion valve assembly including a tubular housing with an inlet end fluidly connected to the condenser and an outlet end fluidly connected to the inlet of said evaporator to provide a refrigerant flow passage from said condenser to said evaporator, said tubular housing enclosing a valve housing between said inlet and outlet, said valve housing forming a control chamber and a piston cylinder, a sealed casing within said control chamber having opposite end portions joined by a corrugated side surface for relative movement of said end portions in response to pressure changes within said control chamber, one end portion fixedly connected to said valve housing, a pilot valve passage spaced from the other end portion of said bellows and extending between said control chamber and said expansion valve inlet, a pilot valve assembly including a spherical valve member closing said pilot valve passage and exposed to refrigerant pressure in said expansion valve inlet from said condenser for producing a closing force upon said spherical valve member, a valve rod operably connected to the other end portion of said casing and extending through said pilot valve passage to cause the valve rod to contact said spherical valve member and open said passage in response to a decrease in pressure within said control chamber, a piston valve mounted for reciprocation in said piston cylinder and exposed on one face to evaporator inlet pressure and exposed on an opposite face to control chamber pressure, said piston valve and said valve housing having slots in their respective walls adapted to align to form a flow passage between said valve inlet and outlet when opposing forces upon the faces of said piston valve move said valve to an open position to admit refrigerant to said evaporator, whereby as condenser outlet pressure increases corresponding to operation of the refrigerating apparatus in higher ambient temperatures the control pressure within said control chamber will be reduced by the increased closing force on said pilot valve member which will cause a decrease in evaporator inlet pressure for a given position of said reciprocal piston valve.

* * * * *